April 27, 1943.  T. B. LOFTHEIM  2,317,785
SEPARATOR
Filed Jan. 3, 1939
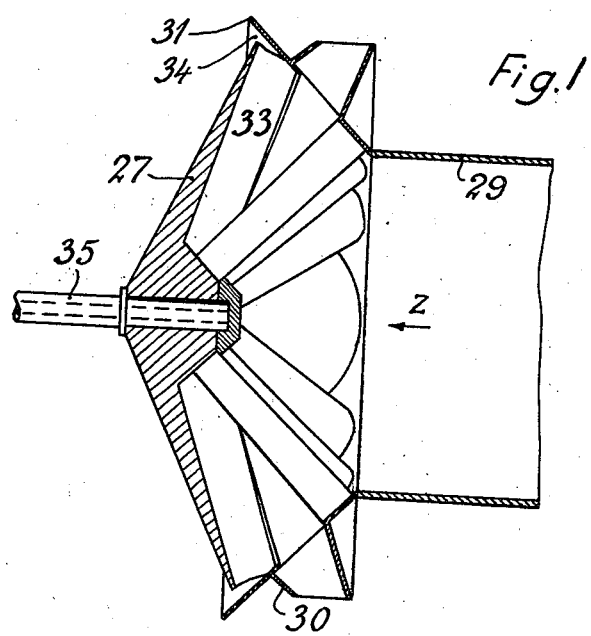
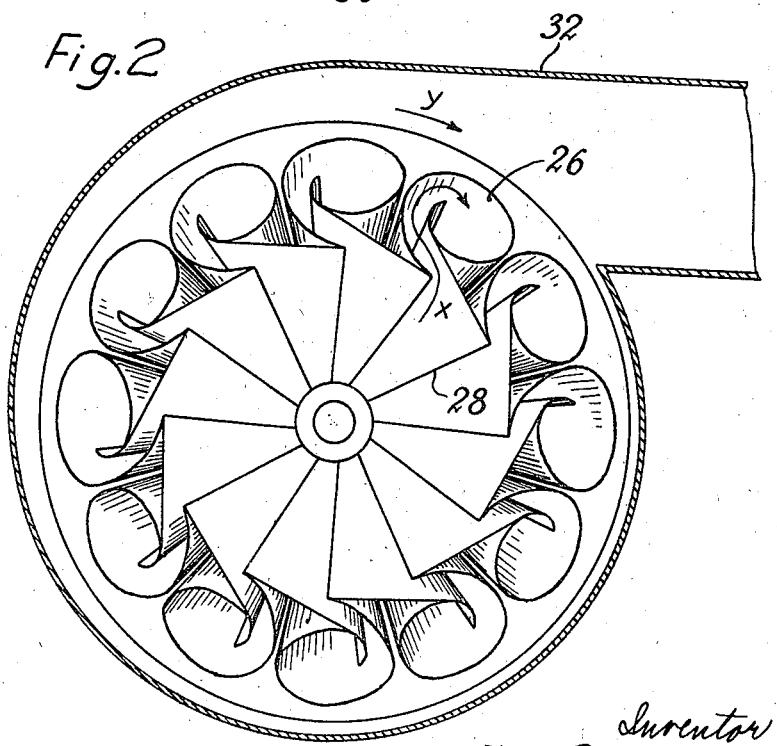

Patented Apr. 27, 1943

2,317,785

UNITED STATES PATENT OFFICE 2,317,785

SEPARATOR

Tor Bjørn Loftheim, Oslo, Norway; vested in the Alien Property Custodian

Application January 3, 1939, Serial No. 249,074
In Norway May 29, 1937

3 Claims. (Cl. 183—77)

This invention relates generally to the art of gas separation.

The object of the present invention is to provide an efficient means for separating materials, especially dust and the like, from air and other gases. A novel feature of the present invention resides in the arrangement of conical air conducting units around a driving shaft to which they are connected, the units having inlets and outlets having a predetermined arrangement relative to the driving shaft whereby the desired results are obtained. Upon rotation of the shaft and the units centrifugal action effects the desired separation of the solid particles from the gas by forcing the larger particles toward the outer walls of the conducting unit with greater force than the relatively lighter particles which fill the inner parts of the units, such particles being carried off through appropriate conduits.

The invention is particularly illustrated in the accompanying drawing wherein:

Figure 1 shows a longitudinal section through a separator constructed in accordance with the present invention.

Figure 2 is a sectional view taken transversely of the rotary axis for the shaft and conical units and showing the conduit for carrying off the cleansed gas.

Referring now more particularly to the drawing, the separator is illustrated as embodying a rotating housing 27 carried upon a supporting shaft 35, which shaft is in turn supported in any suitable manner, not shown.

This housing 27 has a concave face against which are arranged a plurality of spirally coiled conically tapering sheets 26 which are arranged to have their apices convergent at the center of the housing. These separating sheets form conical units which are connected together as shown, so that there are obtained the relatively sharp edges 28 which function to gather the mixture of air or other gas and dust and draw the mixture or cause it to travel inwardly into the conical bodies or units formed by the sheets, in the manner indicated by the arrow X in Figure 2.

The mixture of air or gas and dust is fed axially toward the conical bodies through the conduit 29, according to the arrow Z. The particles are separated in the housing and the cleansed air is conveyed outwardly by the members 30, as shown in Figure 1, which rotate in the direction of the arrow Y with the housing.

These members 30 are formed as a part of a conical wall 31 toward which the larger outer ends of the conical units are directed and the dust, removed from the air, moves outwardly along the surfaces 33 of the conical units to impinge against the wall 31 outwardly of the conveying members 30, to escape by way of the openings 34 which are provided between the periphery of the housing 27 and the wall 31.

Figure 2 illustrates the air receiving housing and the carrying off conduit for the cleansed air and shows the housing 27 and conical units therein, looking toward the sides of the units toward which the dust carrying air or gas travels. This air housing is indicated generally by the numeral 32 and encircles the portion of the separator from which the members 30 extend, the air housing being shown as having a suitable conduit for carrying off the air after it passes out from the members 30.

For the purpose of clarity in illustrating the structure the housing 32 has not been shown in Figure 1 and in Figure 2 the wall 31 with the outlet members 30 is removed so that the conical separating bodies may be more clearly seen.

As previously stated, the wall 31 is conical or rather in the form of a frustrum of a cone and the air conveying members are in the form of a series of nozzles directed outwardly from the wall 31 and arranged in side-by-side relation to form a single annular structure.

I claim:

1. In a separator, a driving shaft, tapering hollow channel forming bodies arranged eccentrically to and about the driving shaft and joined thereto and having a side extending oblique to the axis of the said driving shaft, the channels consisting of spirally coiled conical sheets joined together, the joined portions of the sheets being arranged to form sharp edges directed in the direction of rotation of the shaft.

2. A separator, comprising a rotatable shaft, a body supported upon said shaft and having one concave side face directed axially of the shaft, said body at its center having a hub, a plurality of conical bodies disposed against the concave face of the first body with the narrower ends joined to said hub and extending outwardly along said concave face, each of said conical bodies being formed of a sheet of spirally shaped material whereby each conical body has a longitudinal opening having spaced inner and outer edges, the outer edge of each conical body being joined with the inner edge of the adjacent conical body and the said outer edges of the conical bodies being directed in the direction of rotation of the shaft, means for conducting dust carrying air toward said last-mentioned edges along a path substantially coaxial with the shaft, and a housing enclosing the outer ends of the conical bodies and having radially directed outlets.

3. In a separator, a driving shaft, conical channel bodies arranged eccentrically to and about the driving shaft and joined thereto and having cross-sections increasing with the distance from the said driving shaft, the bodies consisting of spirally coiled sheets joined together, the joined portions of the sheets being shaped to form sharp edges directed in the direction of rotation of the shaft, and said edges being spaced apart to form air and dust admission openings.

TOR BJØRN LOFTHEIM.